(12) United States Patent
Linnig (10) Patent No.: US 11,300,672 B2
(45) Date of Patent: Apr. 12, 2022

(54) LINEAR FM PULSE MODULATION AND STRETCH DEMODULATION IN RADAR USING QUADRATIC SPINNING PHASE SHIFTERS

(71) Applicant: Raytheon Company, Waltham, MA (US)

(72) Inventor: Michael J. Linnig, Waltham, MA (US)

(73) Assignee: RAYTHEON COMPANY, Waltham, MA (US)

(*) Notice: Subject to any disclaimer, the term of this patent is extended or adjusted under 35 U.S.C. 154(b) by 357 days.

(21) Appl. No.: 16/370,096

(22) Filed: Mar. 29, 2019

(65) Prior Publication Data
US 2020/0309934 A1    Oct. 1, 2020

(51) Int. Cl.
*G01S 13/28*   (2006.01)

(52) U.S. Cl.
CPC .................. *G01S 13/282* (2013.01)

(58) Field of Classification Search
CPC ..................................................... G01S 13/282
See application file for complete search history.

(56) References Cited

U.S. PATENT DOCUMENTS

| | | | |
|---|---|---|---|
| 5,751,188 A | 5/1998 | Guegnaud et al. | |
| 2006/0061505 A1* | 3/2006 | Kinghorn | G01S 13/90 342/25 |
| 2008/0159370 A1* | 7/2008 | Atherton | G01S 13/00 375/232 |
| 2009/0066562 A1* | 3/2009 | Altes | G01S 13/9054 342/25 F |

* cited by examiner

*Primary Examiner* — Donald H B Braswell
(74) *Attorney, Agent, or Firm* — Burns & Levinson, LLP; Joseph M. Maraia (57) ABSTRACT

A stretch processing system uses phase shifters to produce a transmitted LFM-ramped signal and a local oscillator signal used to demodulate an LFM-ramped received signal. The phase shifters are driven by digital phase accumulators. The system does not need or use DACs, sine/cosine tables, balanced modulators and mixers and, instead, implements phase shifters as modulators to create the transmit signal and to de-ramp the incoming signal.

16 Claims, 10 Drawing Sheets

LINEAR FM PULSE MODULATION AND STRETCH DEMODULATION IN RADAR USING QUADRATIC SPINNING PHASE SHIFTERS

BACKGROUND

Pulse compression, i.e., Linear FM ("chirp" or LFM) pulse modulation, is a signal processing technique commonly used by radar, sonar and echography to increase the range resolution as well as the signal-to-noise ratio (SNR). Generally, pulse compression is achieved by modulating a transmitted pulse and then correlating a received signal, i.e., a reflected back signal, with the transmitted pulse.

Stretch processing is a signal processing technique for matched filtering of wideband linear chirping waveforms and is suitable for applications seeking very fine range resolution over relatively short range intervals. Stretch processing overcomes problems associated with the high instantaneous bandwidth of high range resolution waveforms, which can be hundreds of megahertz or even exceed 1 GHz, in stretch processing systems.

These known systems for stretch processing generate a clock signal from a Local Oscillator (LO) by Direct Digital Synthesis (DDS) which is a method of producing an arbitrary analog waveform by generating a time-varying signal in digital form and then performing a digital-to-analog conversion. These DDS systems, however, use a relatively large number of expensive components that consume large amounts of space and energy. Accordingly, DDS-based solutions cannot be placed near the antenna structure as per current design requirements for increasing SWAP performance metrics.

What is needed is an improved device for stretch processing.

SUMMARY

In one aspect of the present disclosure, there is a method of demodulating a reflected pulse signal having a first frequency ramp value, the method comprising: receiving the reflected pulse signal at an input of a phase shifter; generating a demodulated signal by the phase shifter applying a phase shift to the reflected pulse signal, wherein the phase shift is a function of the first frequency ramp value; and processing the demodulated signal to obtain at least one compressed pulse signal.

In another aspect of the present disclosure, there is A method of signal processing, comprising: transmitting a first pulse signal having a first frequency ramp value; receiving a second pulse signal at an input of a phase shifter, the second pulse signal being a function of the first pulse signal after being reflected off of one or more reflecting features; generating a demodulated signal by the phase shifter applying a phase shift to the second pulse signal, wherein the applied phase shift is a function of the first frequency ramp value; and processing the demodulated signal to obtain at least one compressed pulse signal.

An apparatus for demodulating a linear frequency modulated (FM) pulse modulated input signal modulated with a first linear FM value, the apparatus comprising: a quadratic phase (QP) command generator configured to generate and output a digital phase command signal and a phase shifter configured to receive the input signal and the digital phase command signal, wherein the phase shifter applies a phase shift to the input signal as a function of the phase command signal and outputs a demodulated input signal.

BRIEF DESCRIPTION OF THE DRAWINGS

Various aspects of the disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the disclosure. In the Figures.

DETAILED DESCRIPTION

Details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

Generally, and as will be described in more detail below, aspects of the present disclosure are directed to a stretch processing system to produce an analog signal for each of a transmitted signal and an LO signal used to demodulate the LFM ramp using inexpensive phase shifters driven by digital phase accumulators, as will be described below.

Advantageously, a system in accordance with an aspect of the present disclosure does not need or use expensive DACs, sine/cosine tables, balanced modulators and mixers and, instead, implements phase shifters to create the transmit signal and to de-ramp the incoming signal. This approach is novel and provides a lower cost solution compared to known implementations.

A general overview of pulse compression and stretch signal processing will now be presented. This is not intended to be a complete or thorough discussion as those of ordinary skill in the art are familiar with the concepts.

Figure 1:
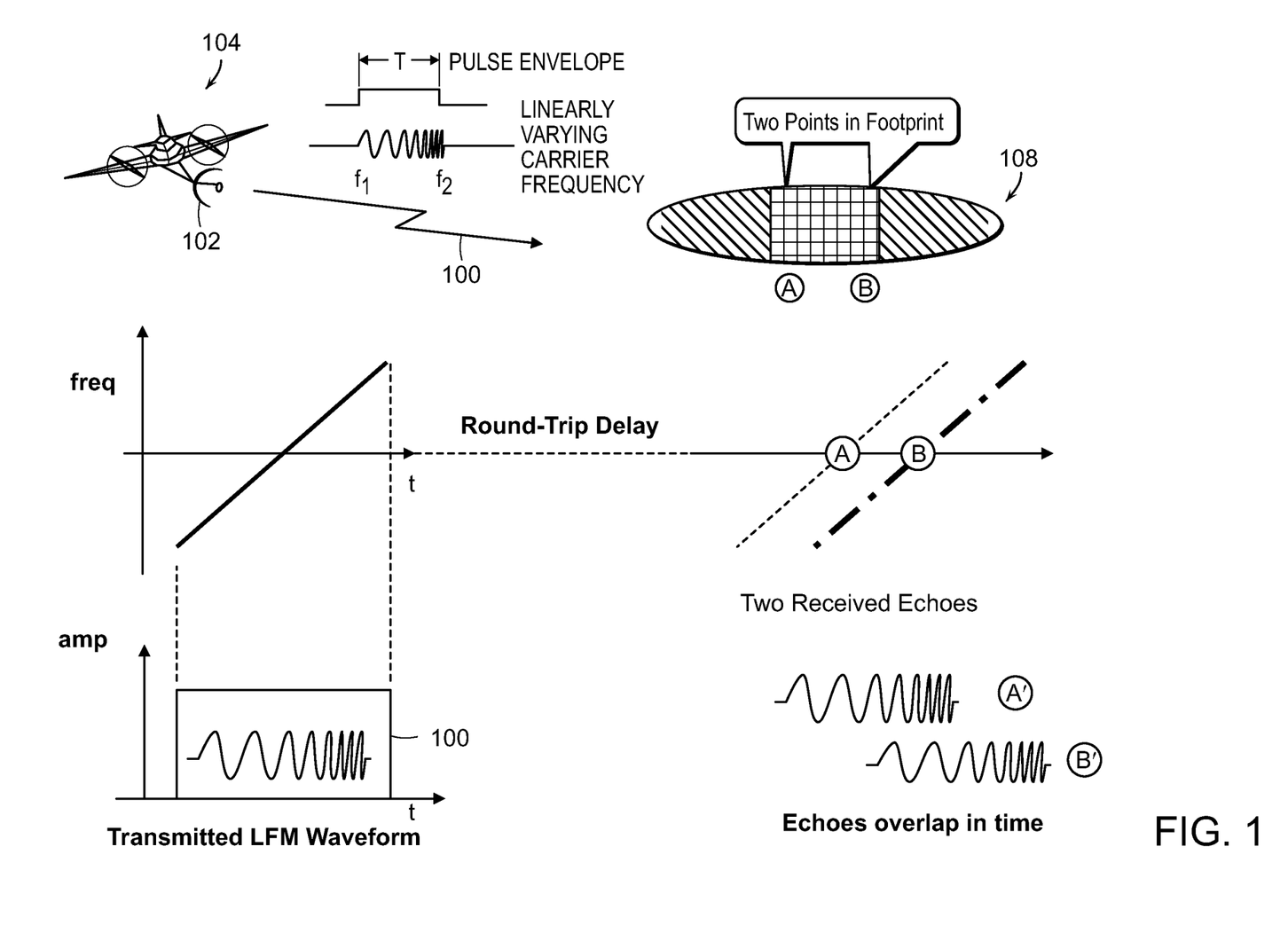
FIG. 1 is an explanation of a radar system using Linear FM (LFM) signals.

Referring to FIG. 1, a signal 100 with a linearly varying carrier frequency is transmitted from, for example, a transmitter/receiver antenna 102 in a radar system of an airplane 104. The signal 100 has a pulse envelope T and the carrier frequency linearly varies from a first frequency f1 to a second frequency f2. The signal 100 is directed toward an area, for example, a portion of the ground, to establish an antenna beam footprint 108 on the ground. There may be, for example, two points of interest A, B on the ground and within the antenna beam footprint 108. Each point of interest will reflect back a respective echo signal A', B' received at the radar system antenna 102. These echo signals A', B' will overlap in time, as shown.

Figure 2:
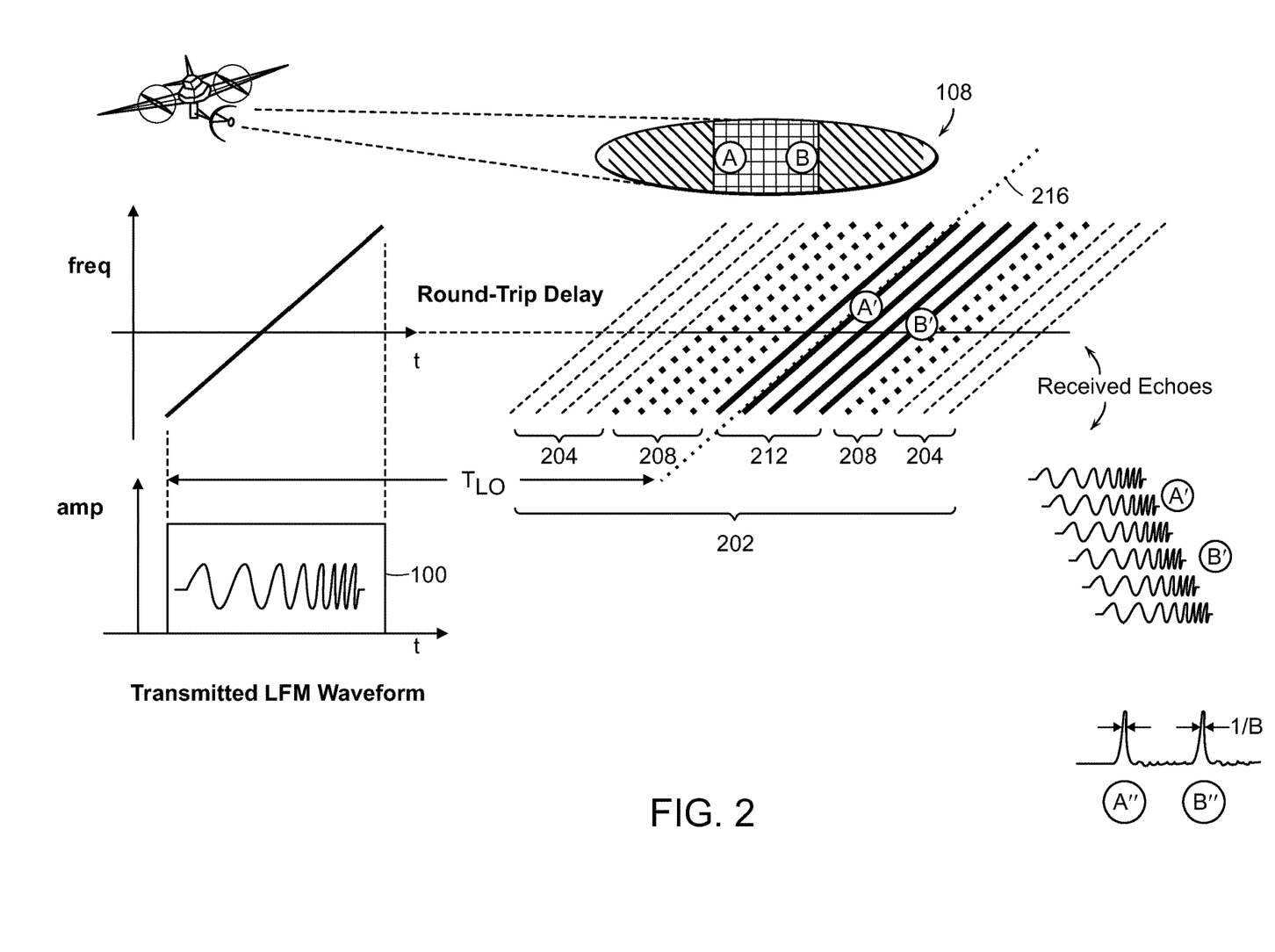
FIG. 2 is a pictorial description of signals in an LFM radar system.

As understood by those of ordinary skill in the art, there are a number of returned signals 202 some of which come from ranges 204 outside of the beam footprint 108, some that come from ranges 208 that are not of interest but within the beam footprint 108 and those that come from a range of interest 212 within the beam footprint 108 and where the two points of interest A, B are located. In order to obtain the echo signals of interest A', B', a swept LO signal 216, with the same LFM characteristics as the signal 100, i.e., same frequency ramp, and delayed by an amount $T_{LO}$ per known approaches to match the returning pulses, is mixed with the received signals of interest 212. The returning signal is mixed with the LO and the result is that each ramp returning from the targets A, B is turned into a pure tone with a respective frequency that is proportional to the distance from the transmitter 104. A Fourier Transform of the resulting signal turns these pure tones into detectible range bins.

Figure 3:
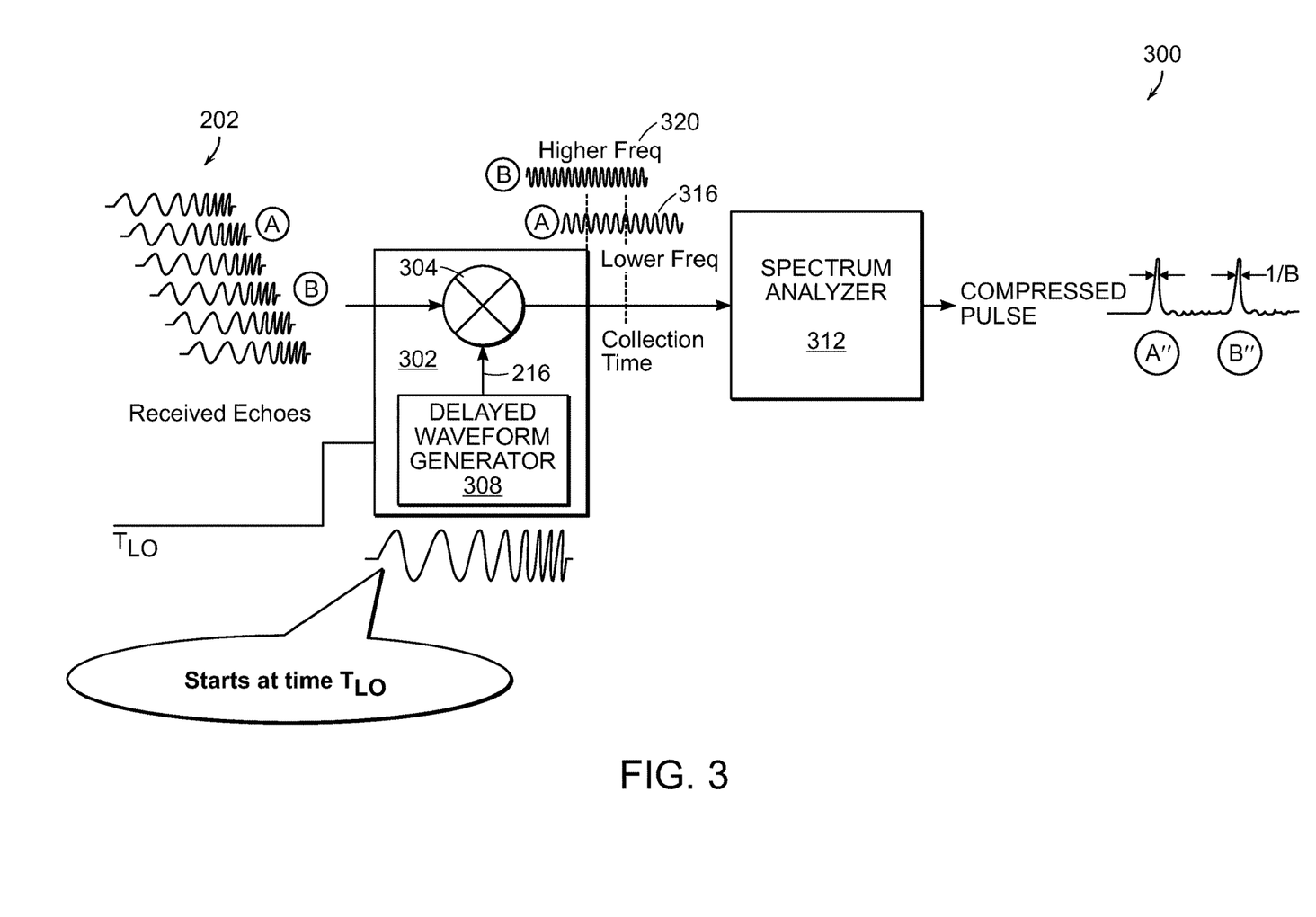
FIG. 3 represents operation of a stretch processing system.

Referring now to FIG. 3, a stretch radar receiver 300 includes a stretch processing module 302 and a spectrum analyzer 312. The stretch processing module 302 includes a mixer 304 and a delayed waveform generator 308. The delayed waveform generator 308 is configured and arranged to output the delayed swept LO signal 216. The mixer 304 is configured and arranged to receive the returned signals 202 and mix them with the delayed swept LO signal 216 to output a first signal 316 of a first frequency and a second signal 320 of a second frequency that is higher than the first frequency representing, respectively, the echo signals of interest A', B'. The first and second signals 316, 320 are received and processed, for example, by applying Fast Fourier Transforms (FFT), by the spectrum analyzer or reduced bandwidth correlation processor 312 and two compressed pulses A" and B" are output, representing the two points of interest A, B, as is known.

Figure 4:
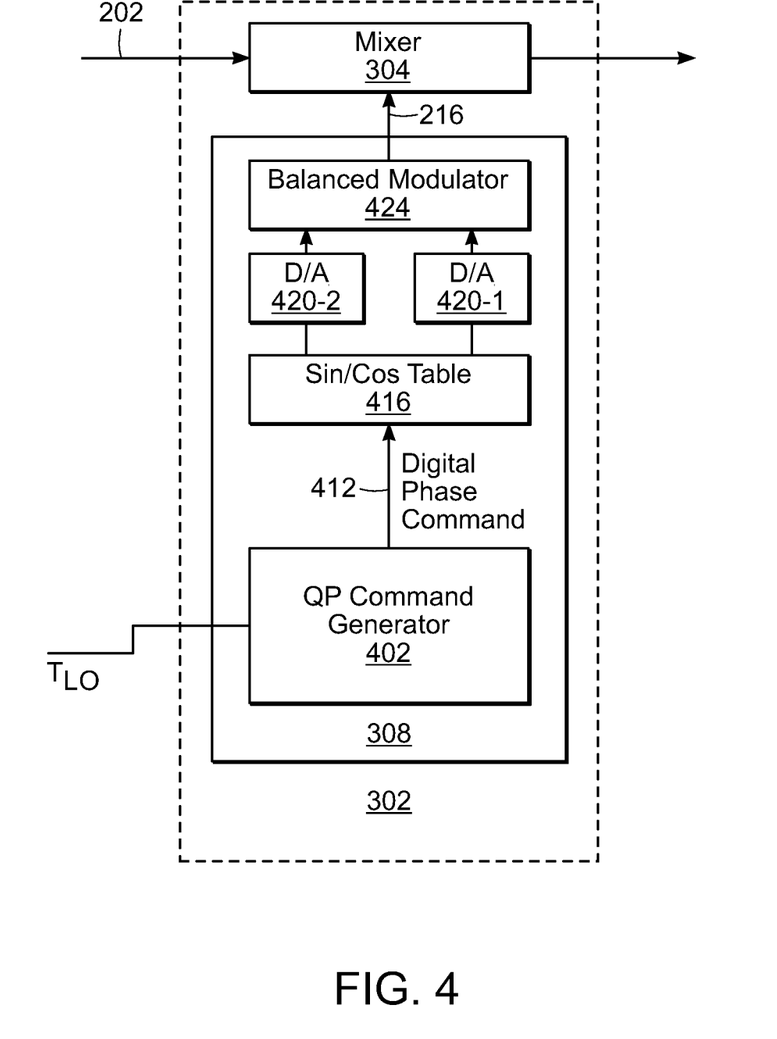
FIG. 4 is a more detailed view of the stretch processing system of FIG. 3.

As shown in FIG. 4, the waveform generator 308 is includes a quadratic phase (QP) command generator 402 that functions as a numerically controlled oscillator producing a quadratically ramped series of phase commands 412, i.e., linear FM modulation.

The series of digital phase commands 412 is directed from the QP command generator 402 to a sin/cos lookup table 416, i.e., a phase-to-amplitude lookup table, the output of which is directed to two DACs 420-1, 420-2. The outputs of the two DACs 420-1, 420-2 are provided to a balanced modulator 424 that provides the delayed swept LO signal 216 to the mixer 304.

Thus, the waveform generator 308 produces the analog signal 216 by generating a quadratic phase signal 412, i.e., an LFM ramp, in digital form and then performing a digital-to-analog conversion. The digital phase commands 412 are converted by the phase-to-amplitude lookup table 316 into the sine-wave amplitude information that is presented to the DACs 420-1, 420-2. For complex signals, two DACs are used, one for an in-phase component and one for a quadrature component of the signal 216. Those two signals are combined in the balanced modulator 424 and then mixed with the incoming signal 202.

Figure 5:
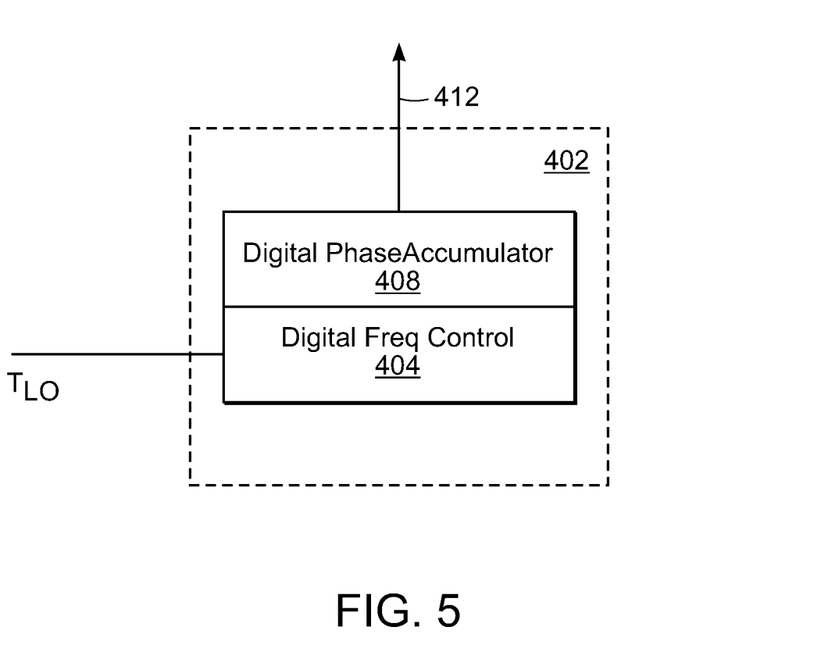
FIG. 5 is an implementation of a quadratic phase (QP) command generator in the stretch processing system of FIG. 4.

In one common, i.e., known, approach, the QP command generator 402 can be implemented, as shown in FIG. 5, with a digital frequency controller 404 coupled to a digital phase accumulator 408, each operating according to known direct digital synthesis (DDS) principles. As a result, the phase accumulator 408, at each clock sample, adds a linearly ramped value determined by the digital frequency controller 404 to produce the series of digital phase commands 412.

Figure 6:
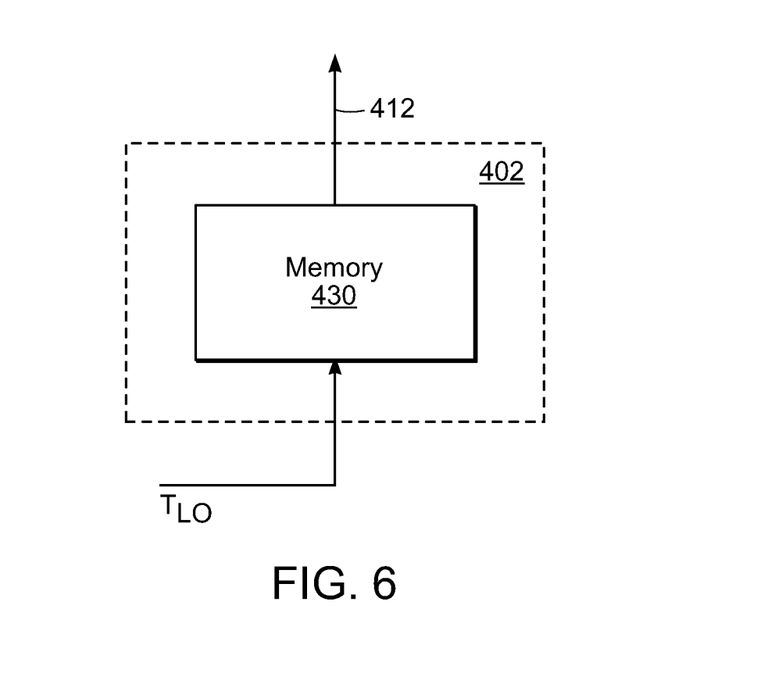
FIG. 6 is another implementation of a QP command generator in the stretch processing system of FIG. 4.

Alternatively, as shown in FIG. 6, as is also known, the QP command generator 402 can be implemented as a digital memory 430 having an array of digital phase commands stored therein. The digital phase commands are read out of the memory 430 at the appropriate time The digital phase commands produced by either method are input to digital to analog processing, components 416, 420-1, 420-2 and 424, to produce the delayed swept LO described previously.

One of ordinary skill in the art will understand that, mathematically, the transmitted signal can be represented as $e^{i(at+bt^2)}$ where t is time, a and b are constants related to the start frequency and frequency ramp, i is the square root of $-1$ ($\sqrt{-1}$), and e is Euler's constant. If the swept LO's quadratic phase command has a negative exponent, i.e., it is of the form $e^{-i(at+bt^2)}$ then the signal from the mixer will have a frequency proportional to the difference in time from the start of the Swept LO and the receive time of the signal from an object of interest. Thus, the range to the target can be deduced by using a spectrum analyzer or a Fast Fourier Transform (FFT).

Figure 7:
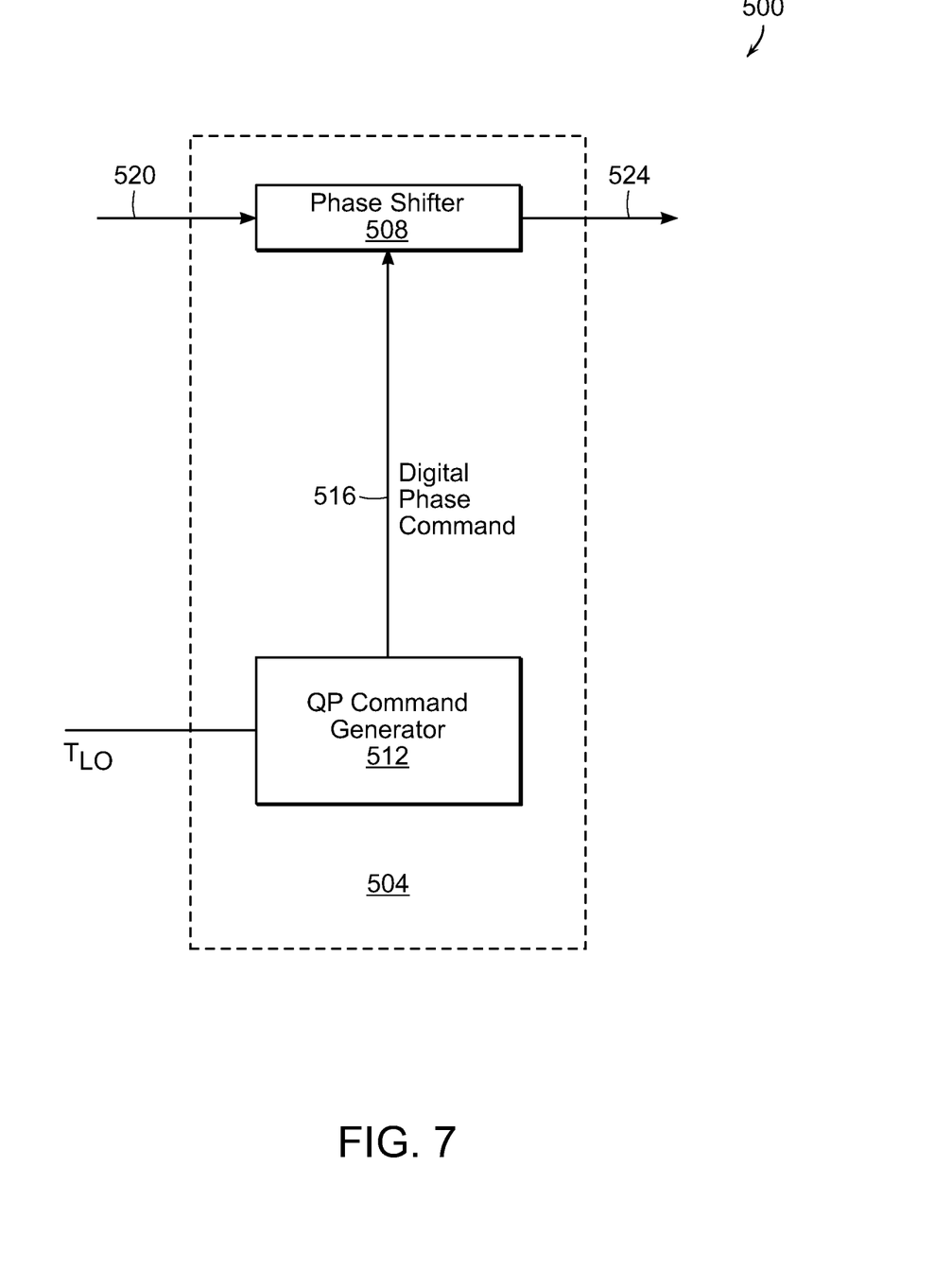
FIG. 7 presents an LFM Stretch demodulator in accordance with an aspect of the present disclosure.

Advantageously, a stretch demodulation system 500, in accordance with one aspect of the present disclosure, comprises a chirp signal generator 504 that includes a phase shifter 508 and a QP command generator 512, as shown in FIG. 7. The QP command generator 512 outputs a digital phase command signal 516 representative of how much to step the phase of a signal 520 that is input to the phase shifter 508. Accordingly, a signal 524 is a de-ramped version of the input signal 520.

Advantageously, the sin/cos lookup table 416, the two DACs 420-1, 420-2, the balanced modulator 424 and the mixer 304 of the known approach have been replaced with the phase shifter 508. The phase shifter 508 mixes the digital phase commands with the incoming signals 520, de-ramping the incoming signals 520 into tones that correspond to their distance.

In the context of the present disclosure, the function of the phase shifter 508 can be implemented as a two-bit phase shifter with shifts of 0, $\pi/2$, $\pi$, and $3\pi/2$ radians (as an example). Advantageously, a two-bit phase shifter may be implemented as it is simpler and, therefore, less expensive, than a general purpose phase shifter which might be six bits, i.e., with 64 phase states. The increase in noise with a smaller number of bits may be acceptable in some applications.

Additionally, aspects of the present disclosure do not use a DDS waveform generator 308 to produce the delayed swept LO signal 216 and this also reduces the complexity, cost, size and weight of the system as compared to known systems. Advantageously, phase shifters are relatively inexpensive and simple devices as compared to DDS systems.

Figure 8:
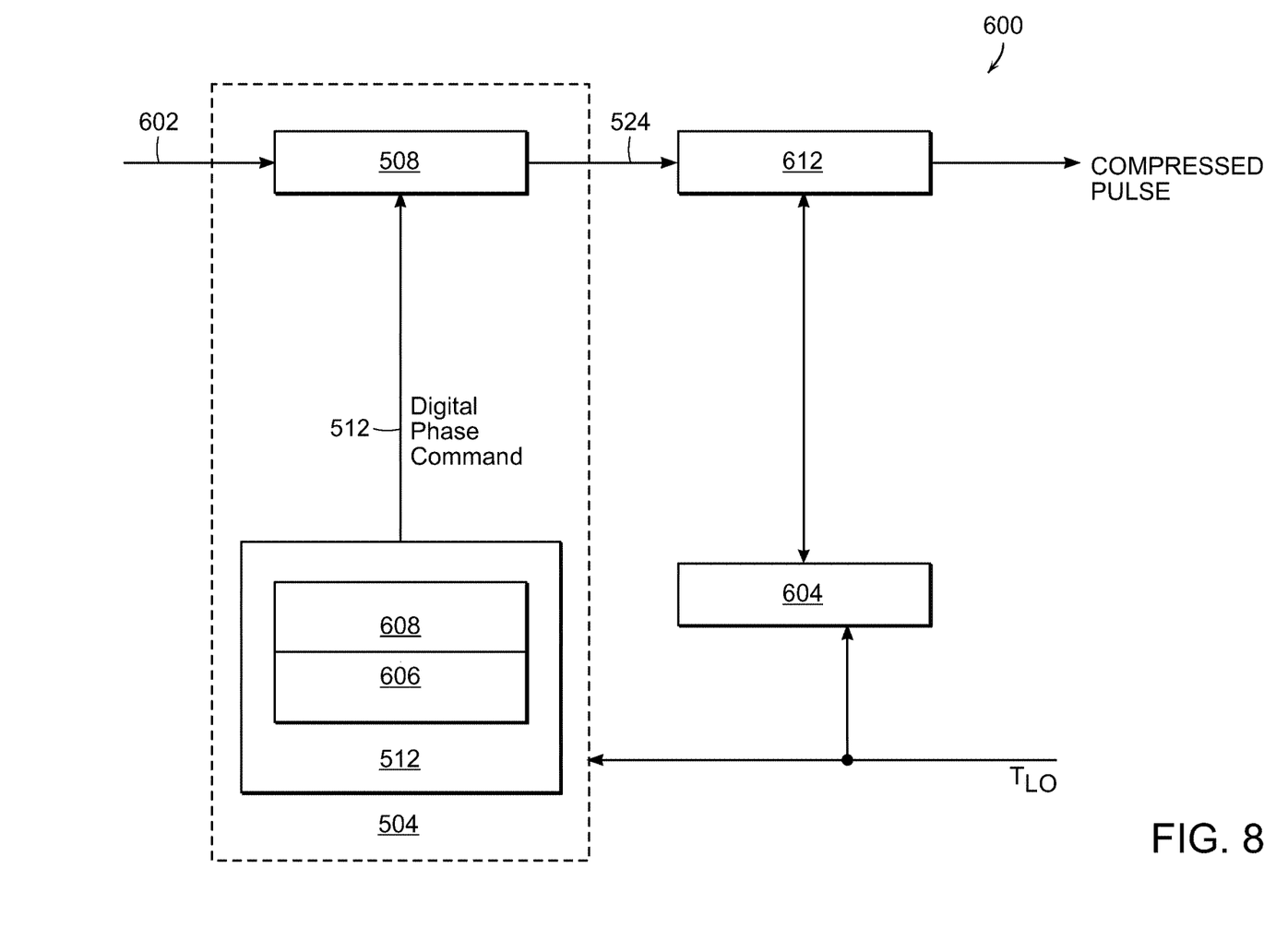
FIG. 8 is an LFM stretch processing system in accordance with an aspect of the present disclosure.

In another aspect of the present disclosure, a stretch processing system 600 includes the chirp signal generator 504 configured and arranged to receive returned signals 602 as an input to the phase shifter 508, as depicted in FIG. 8. A controller 604 provides the appropriate delay start time value $T_{LO}$ and the QP command generator 512, comprising a digital frequency controller 606 and a digital phase accumulator 608, controls the phase shifter 508 to produce a quadratic phase ramp (LFM) to implement stretch processing on the input signal 602. In other words, the returning signal 602 is passed thorough the rapidly changing phase shifter 508, which de-ramps the LFM signal.

Figure 9:
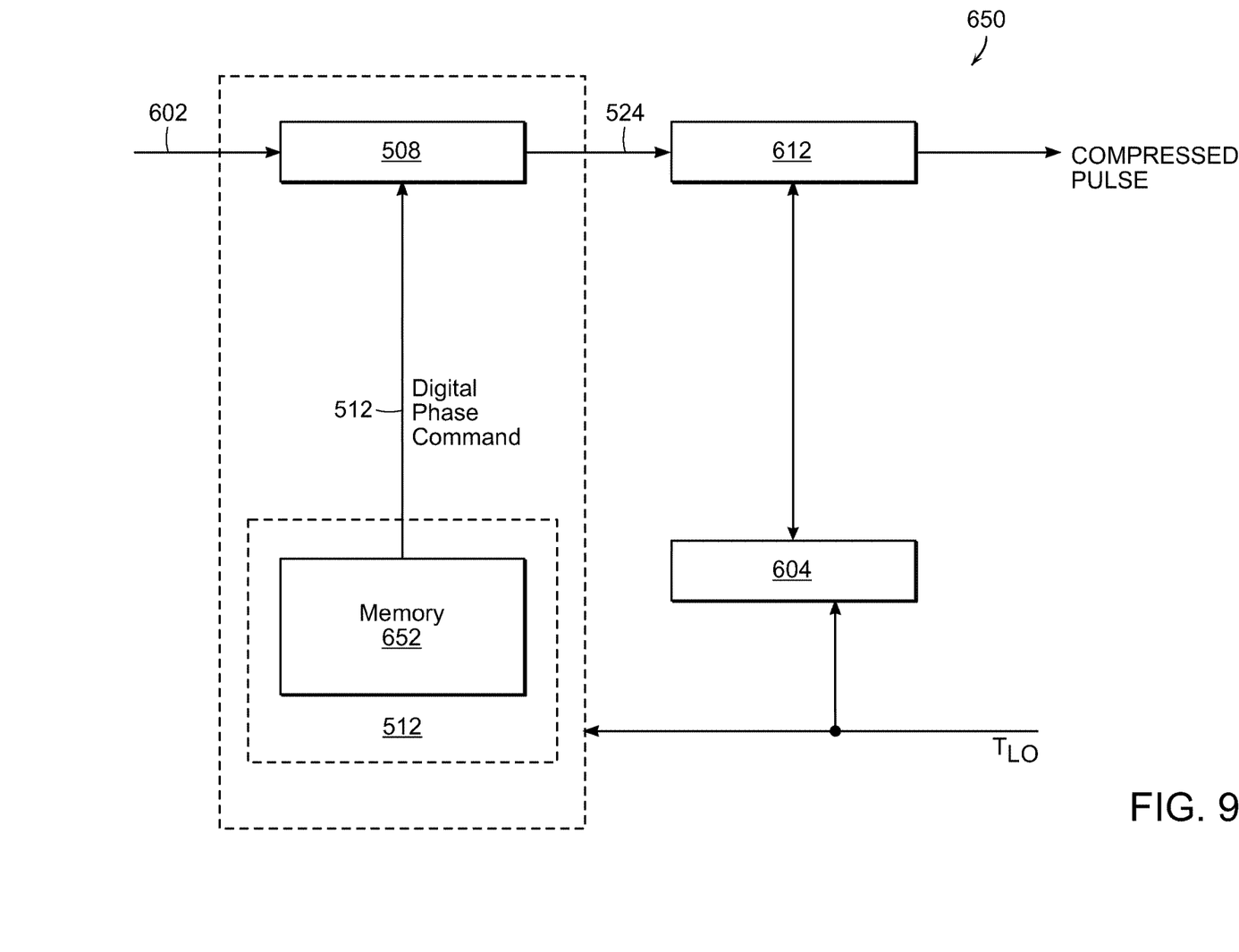
FIG. 9 is an LFM stretch processing system in accordance with another aspect of the present disclosure.

Alternatively, in another aspect of the present disclosure, as shown in FIG. 9, a stretch processing system 650 includes the components of the system 600 of FIG. 8, however, the QP command generator 512 comprises a memory 652 to generate the digital phase commands sent to the phase shifter 508.

Figure 10:
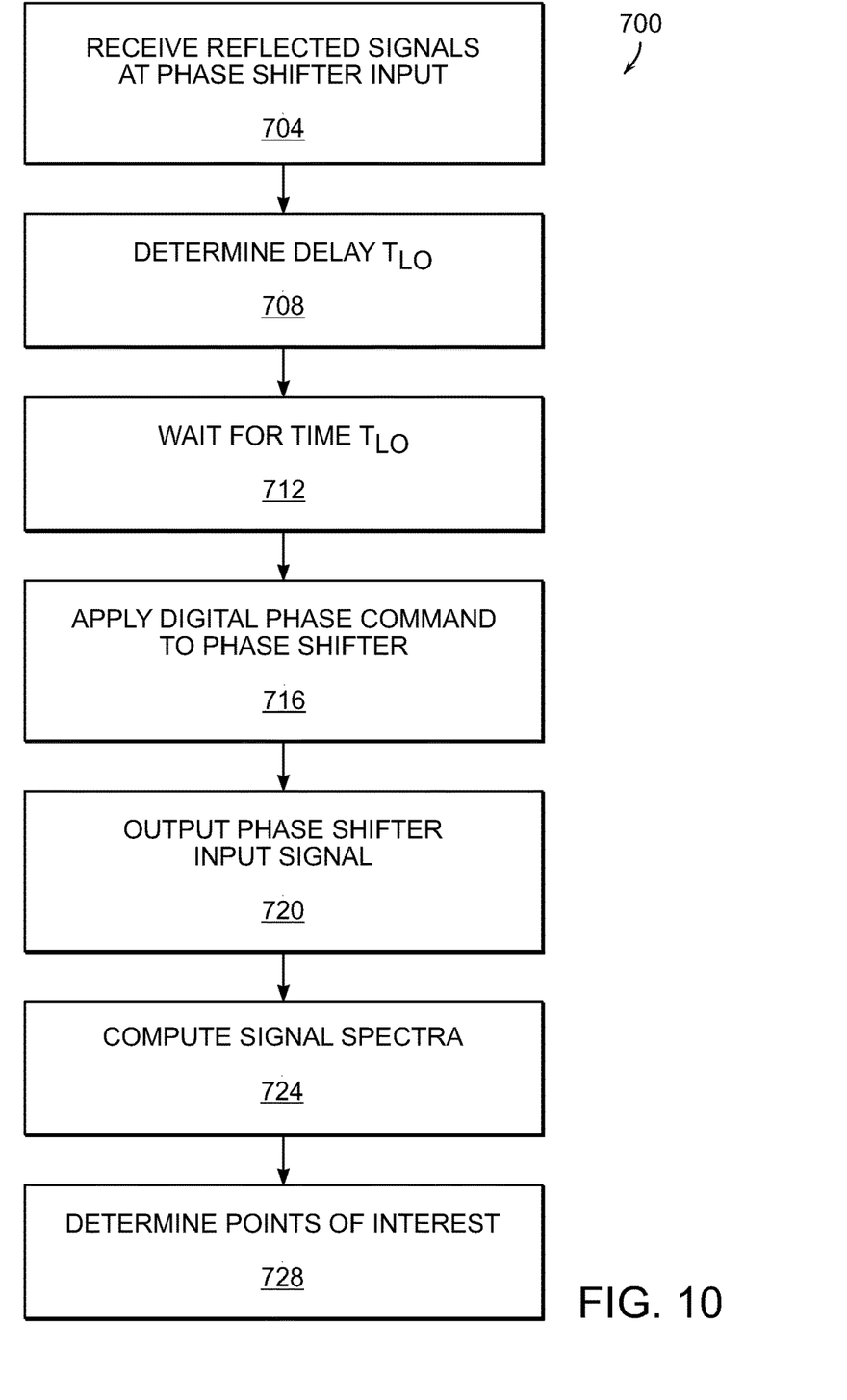
FIG. 10 is a method of stretch processing in accordance with an aspect of the present disclosure.

Thus, a stretch processing method 700 in accordance with an aspect of the present disclosure, referring to FIG. 10, includes receiving reflected signals 602 at an input to a phase shifter 508, step 704, determining a delay time $T_{LO}$, step 708, waiting the delay time $T_{LO}$, step 712, and then applying a digital phase command 512 to the phase shifter 508 that is matched to the LFM applied to a transmitted signal, step 716. A phase-shifted input signal, i.e., a de-ramped version, is then output, step 720, and the spectra of the received signals are determined, i.e., computed, usually with an FFT, at step 724, to determine points of interest, step 728.

One of ordinary skill in the art will understand that the module 504 can also be used to generate the transmitted LFM waveform 100. Thus, in a radar system using the present disclosure there could be two modules 504 provided, one for transmit and the other for stretch processing on receive.

Various implementations of the above-described systems and methods described may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, data processing apparatus. The implementation can, for example, be a programmable processor, a computer, and/or multiple computers.

The above-described implementations generally depict a computer implemented system employing at least one processor or processing unit executing program steps out of at least one memory to obtain the functions herein described. It should be recognized that the presently described methods may be implemented via the use of software, firmware or alternatively, implemented as a dedicated hardware solution such as an FPGA (field programmable gate array) and/or an ASIC (application specific integrated circuit). Modules, subroutines, and software agents can refer to portions of the computer program, the processor or processing unit, the special circuitry, software, and/or hardware that implements that functionality.

Figure 11:
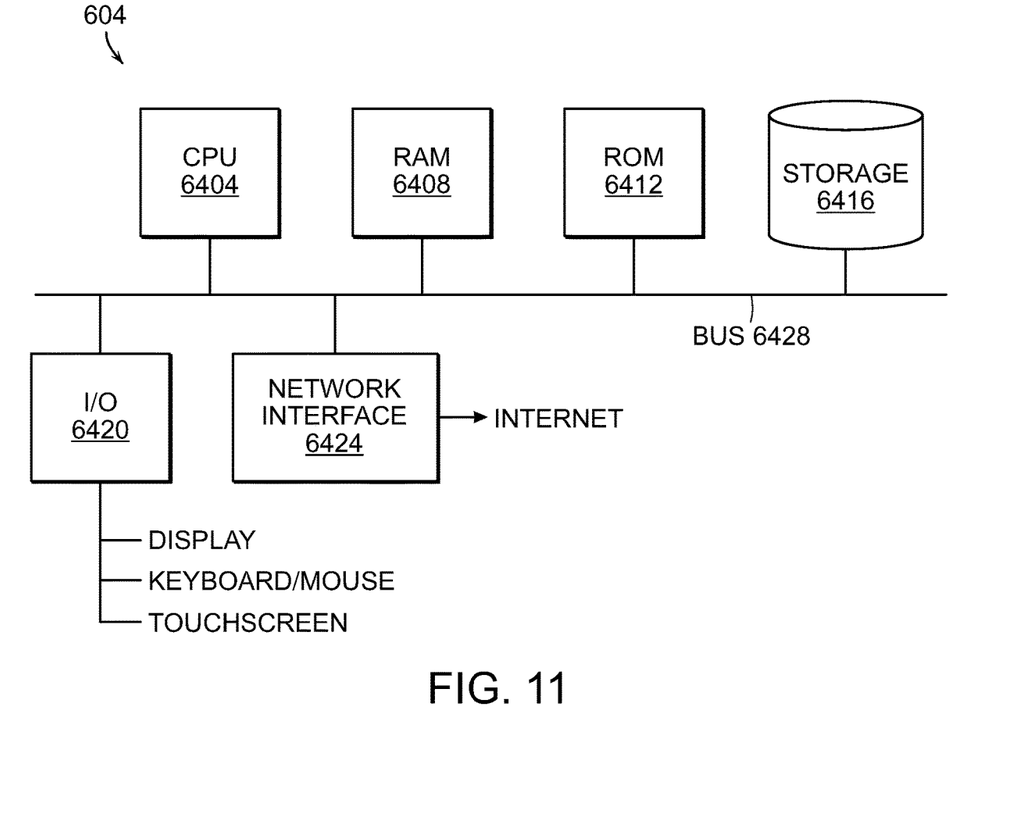
FIG. 11 is a controller for the stretch processing system of the present disclosure.

Referring to FIG. 11, the controller 604 may be implemented as a system that may comprise a CPU 6404, RAM 6408, ROM 6412, a mass storage device 6416, for example, a disk drive, an I/O interface 6420 to couple to, for example, display, keyboard/mouse or touchscreen, or the like and a network interface module 6424. All of these modules are in communication with each other through a bus 6428. The CPU 6404 executes an operating system to operate and communicate with these various components.

A computer program can be written in any form of programming language, including compiled and/or interpreted languages, and the computer program can be deployed in any form, including as a stand-alone program or as a subroutine, element, and/or other unit suitable for use in a computing environment.

As utilized, the one or more processing units may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU").

The computer-readable medium may store instructions executable by the one or more processing units and may include computer storage media and/or communication media. Computer storage media may include one or more of volatile memory, nonvolatile memory, and/or other persistent and/or auxiliary computer storage media.

It is to be understood that the disclosure is not limited in its application to the details of construction and the arrangement of the components set forth herein or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination.

The present disclosure is illustratively described in reference to the disclosed implementations. Various modifications and changes may be made to the disclosed implementations by persons skilled in the art without departing from the scope of the present disclosure as defined in the appended claims.

What is claimed is:

1. A method of demodulating a reflected pulse signal having a first frequency ramp value, the method comprising:
   receiving and demodulating the reflected pulse signal at an input of a phase shifter;
   generating a demodulated signal by the phase shifter by applying a phase shift to the reflected pulse signal, wherein the phase shift is a function of the first frequency ramp value,
   wherein applying a phase shift to the reflected pulse signal is delayed a predetermined amount of time after the reflected pulse signal has been received at the phase shift; and
   processing the demodulated signal to obtain at least one compressed pulse signal.

2. The method of claim 1, wherein the reflected pulse signal is a reflection of the transmitted pulse signal.

3. The method of claim 2, wherein the transmitted pulse signal comprises a linear frequency modulated (FM) pulse modulated signal modulated with a first linear FM value.

4. The method of claim 3, wherein applying the phase shift to the reflected pulse signal comprises:
   applying a phase shift as a function of the first linear FM value.

5. The method of claim 1, further comprising:
   controlling the phase shift applied to the reflected pulse signal by operation of a digital frequency controller and a digital phase accumulator coupled to the phase shifter.

6. The method of claim 1, further comprising:
controlling the phase shift applied to the reflected pulse signal by operation of a memory coupled to the phase shifter,
wherein the memory comprises an array of phase commands stored therein.

7. The method of claim 6, further comprising:
accessing the phase commands from the memory as a function of time.

8. A method of signal processing, comprising:
transmitting a first pulse signal having a first frequency ramp value;
receiving a second pulse signal at an input of a phase shifter, the second pulse signal being a function of the first pulse signal after being reflected off of one or more reflecting features;
generating a demodulated signal by the phase shifter applying a phase shift to the second pulse signal, wherein the applied phase shift is a function of the first frequency ramp value;
delaying application of the phase shift to the second pulse signal a predetermined amount of time after the second pulse signal has been received at the phase shifter; and
processing the demodulated signal to obtain at least one compressed pulse signal.

9. The method of claim 8, further comprising:
delaying application of the phase shift to the second pulse signal a predetermined amount of time after transmitting the first pulse signal.

10. The method of claim 9, wherein the transmitted pulse signal comprises a linear frequency modulated (FM) pulse modulated signal modulated with a first linear FM value.

11. The method of claim 10, wherein applying the phase shift to the reflected pulse signal comprises:
applying a phase shift as a function of the first linear FM value.

12. The method of claim 8, further comprising:
controlling the phase shift applied to the second pulse signal by operation of a digital frequency controller and a digital phase accumulator coupled to the phase shifter.

13. The method of claim 8, further comprising:
controlling the phase shift applied to the second pulse signal by operation of a memory coupled to the phase shifter,
wherein the memory comprises an array of phase commands stored therein.

14. The method of claim 13, further comprising:
accessing the phase commands from the memory as a function of time.

15. An apparatus for demodulating a linear frequency modulated (FM) pulse modulated input signal modulated with a first linear FM value, the apparatus comprising:
a quadratic phase (QP) command generator configured to generate and output a digital phase command signal and a phase shifter configured to receive and demodulate the input signal and the digital phase command signal,
wherein the phase shifter applies a phase shift to the input signal as a function of the phase command signal and outputs a demodulated input signal,
wherein the phase shifter is configured to delay the phase shifting of the input signal a predetermined amount of time after the input signal is received.

16. The apparatus of claim 15, wherein the phase shifter is configured to phase shift the input signal as a function of the first linear FM value.

* * * * *